US012667229B2

(12) United States Patent
Ambrose

(10) Patent No.: US 12,667,229 B2
(45) Date of Patent: Jun. 30, 2026

(54) SCRAPING UNIT FOR STAND MIXER

(71) Applicant: Hamilton Beach Brands, Inc., Glen Allen, VA (US)

(72) Inventor: Koen Ambrose, Glen Allen, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 452 days.

(21) Appl. No.: 18/204,055

(22) Filed: May 31, 2023

(65) Prior Publication Data
US 2024/0398168 A1 Dec. 5, 2024

(51) Int. Cl.
*A47J 43/07* (2006.01)
*A47J 43/044* (2006.01)

(52) U.S. Cl.
CPC ......... *A47J 43/0711* (2013.01); *A47J 43/044* (2013.01)

(58) Field of Classification Search
CPC ............................ A47J 43/0711; A47J 43/044
USPC ..... 366/309, 312, 313, 325.94, 221; 62/342, 62/343
See application file for complete search history.

(56) References Cited

U.S. PATENT DOCUMENTS

| | | | | |
|---|---|---|---|---|
| 2,810,557 A | * | 10/1957 | Phelan .................... | A23G 9/224 |
| | | | | 366/311 |
| 3,415,497 A | * | 12/1968 | Johnson .................. | A47J 43/04 |
| | | | | 15/236.01 |
| 3,504,391 A | * | 4/1970 | Mccarty ................. | A47J 43/288 |
| | | | | D7/413 |
| 4,946,285 A | * | 8/1990 | Vennemeyer ......... | B01F 27/951 |
| | | | | 366/288 |
| 5,556,201 A | * | 9/1996 | Veltrop ................. | B01F 27/091 |
| | | | | 366/288 |
| 5,791,777 A | * | 8/1998 | Mak ..................... | A47J 43/0705 |
| | | | | 366/129 |
| 6,205,806 B1 | * | 3/2001 | Huang ..................... | A23G 9/12 |
| | | | | 62/343 |
| 2010/0251907 A1 | * | 10/2010 | Fernandez ............ | A47J 43/285 |
| | | | | 99/495 |
| 2012/0294108 A1 | * | 11/2012 | Dickson, Jr. .......... | B01F 27/808 |
| | | | | 366/205 |
| 2024/0285126 A1 | * | 8/2024 | Lebsack .............. | A47J 43/1018 |
| 2024/0398168 A1 | * | 12/2024 | Ambrose .............. | A47J 43/044 |
| 2025/0248567 A1 | * | 8/2025 | Pierce .................. | A47J 43/0711 |

FOREIGN PATENT DOCUMENTS

| | | | | | |
|---|---|---|---|---|---|
| ES | | 2350036 T3 | * | 1/2011 | ............ A47J 43/255 |
| ES | | 2983674 T3 | * | 10/2024 | ............ A47J 43/046 |
| GB | | 2551162 A | * | 12/2017 | ......... A47J 43/0705 |
| WO | WO-2013188925 A1 | * | 12/2013 | ............. B01F 27/95 |
| WO | WO-2023099190 A1 | * | 6/2023 | ............ A47J 43/044 |

* cited by examiner

*Primary Examiner* — Charles Cooley
(74) *Attorney, Agent, or Firm* — Alexander D. Raring

(57) ABSTRACT

A scraping unit for a stand mixer includes: an upper ring; and a plurality of fingers extending downwardly from the upper ring, the fingers having a curvilinear profile selected to confront an inner surface of a bowl of a stand mixer. The scraping unit may be employed in combination with the bowl of a stand mixer to enable the user to redirect foodstuff that has collected out of range of the beaters of the stand mixer back into the range of the beaters.

19 Claims, 13 Drawing Sheets

252

240

244

242

270

252

240

244

270

242

SCRAPING UNIT FOR STAND MIXER

FIELD OF THE INVENTION

The present application is directed generally to mixers, and more particularly to stand mixers.

BACKGROUND

Stand mixers are popular home appliances used for multiple tasks in combining ingredients, such as mixing, creaming, blending, and the like. Stand mixers typically include a base that supports a bowl, an upright support arm that extends upwardly from the base, and a cantilevered "head" that extends horizontally from the upright support on which beaters are mounted. The beaters extend downwardly from the arm into the bowl for use. Stand mixers ordinarily employ one of two basic techniques to enable the bowl to be inserted or removed from its position beneath the beaters: tilting heads or bowl lifts (bowl lifts are used on stand mixer models for which the head of the mixer is in a fixed position).

One issue that can arise with stand mixers is the collection of the foodstuff being mixed outside of the reach of the beaters. More viscous foodstuffs being mixed (such as cookie batter) may be flung by the beaters to a position in the bowl beyond the reach of the beaters, where foodstuff may stick to the bowl and therefore be excluded from further mixing. Typically this issue is addressed by ceasing operation of the mixer so that the user can manually scrape the stuck foodstuff back into the path of the beaters. This scraping operation also typically also requires either tilting the head of the mixer away from the bowl, raising the head of the mixer, or lowering the bowl to provide easy access to the user to perform such scraping. It may be desirable to provide another technique for scraping stuck foodstuffs back into the reach of the beaters.

SUMMARY

As a first aspect, embodiments of the invention are directed to a scraping unit for a stand mixer. The scraping unit comprises: an upper ring; and a plurality of fingers extending downwardly from the upper ring, the fingers having a curvilinear profile selected to confront an inner surface of a bowl of a stand mixer. The scraping unit may be employed in combination with the bowl of a stand mixer to enable the user to redirect foodstuff that has collected out of range of the beaters of the stand mixer back into the range of the beaters.

As the second aspect, embodiments of the invention are directed to a method of using a stand mixer comprising: (a) positioning a scraping unit on a bowl of a stand mixer, the scraping unit including an upper ring that engages an upper edge of the bowl and a plurality of fingers extending downwardly from the upper ring, the fingers having a curvilinear profile selected so that the fingers confront an inner surface of the bowl; (b) mixing a foodstuff contained in the bowl with beaters of the stand mixer; and (c) rotating the scraping unit relative to the bowl to convey portions of the foodstuff that have collected outside the range of the beaters into the range of the beaters.

DETAILED DESCRIPTION

Figure 1A:
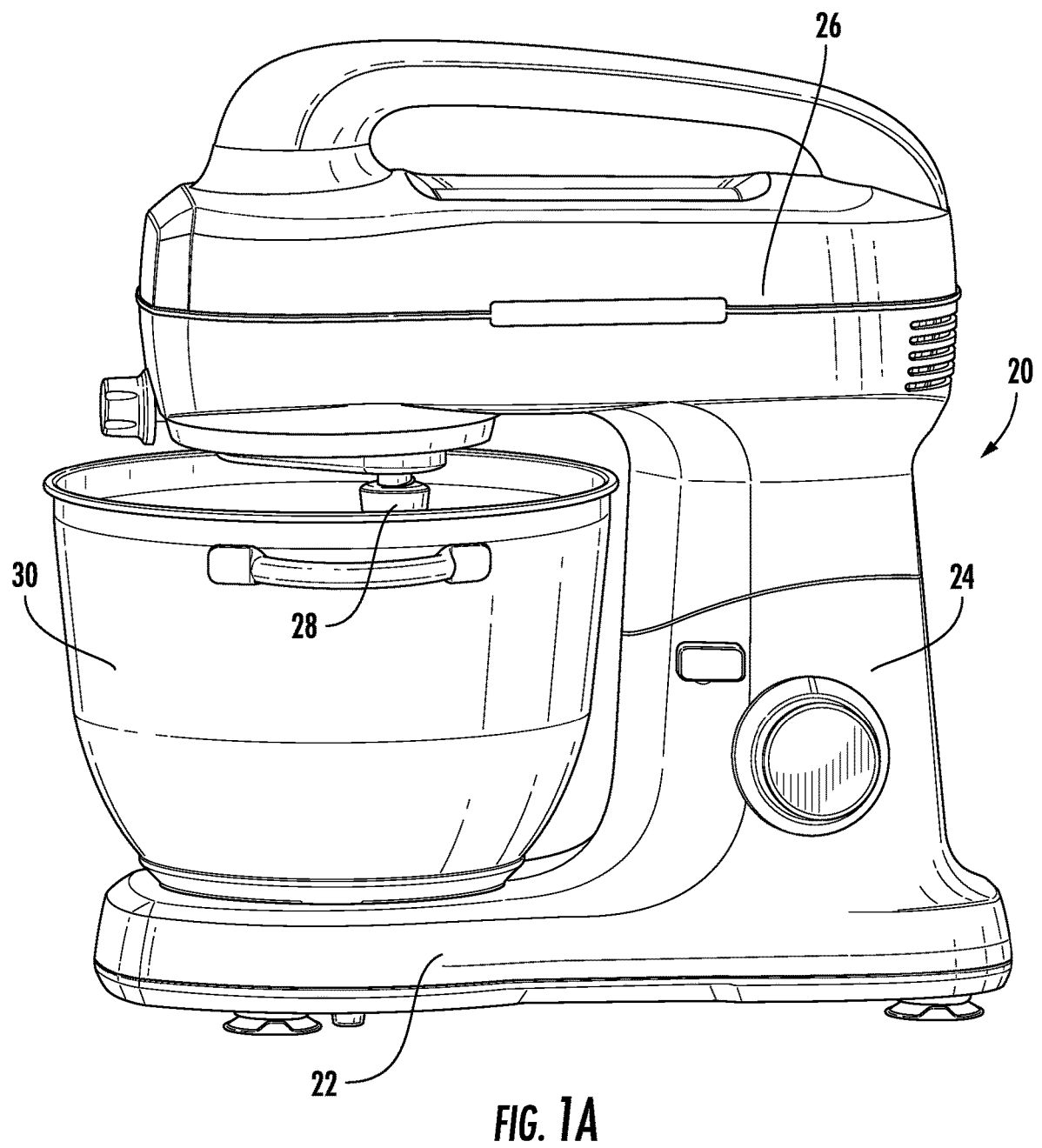
FIG. 1A is a perspective view of a stand mixer that can be used with a scraping unit according to embodiments of the invention.

The present invention is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

It will also be understood that, as used herein, the terms "example," "exemplary," and derivatives thereof are intended to refer to non-limiting examples and/or variants embodiments discussed herein, and are not intended to indicate preference for one or more embodiments discussed herein compared to one or more other embodiments.

Figure 1B:
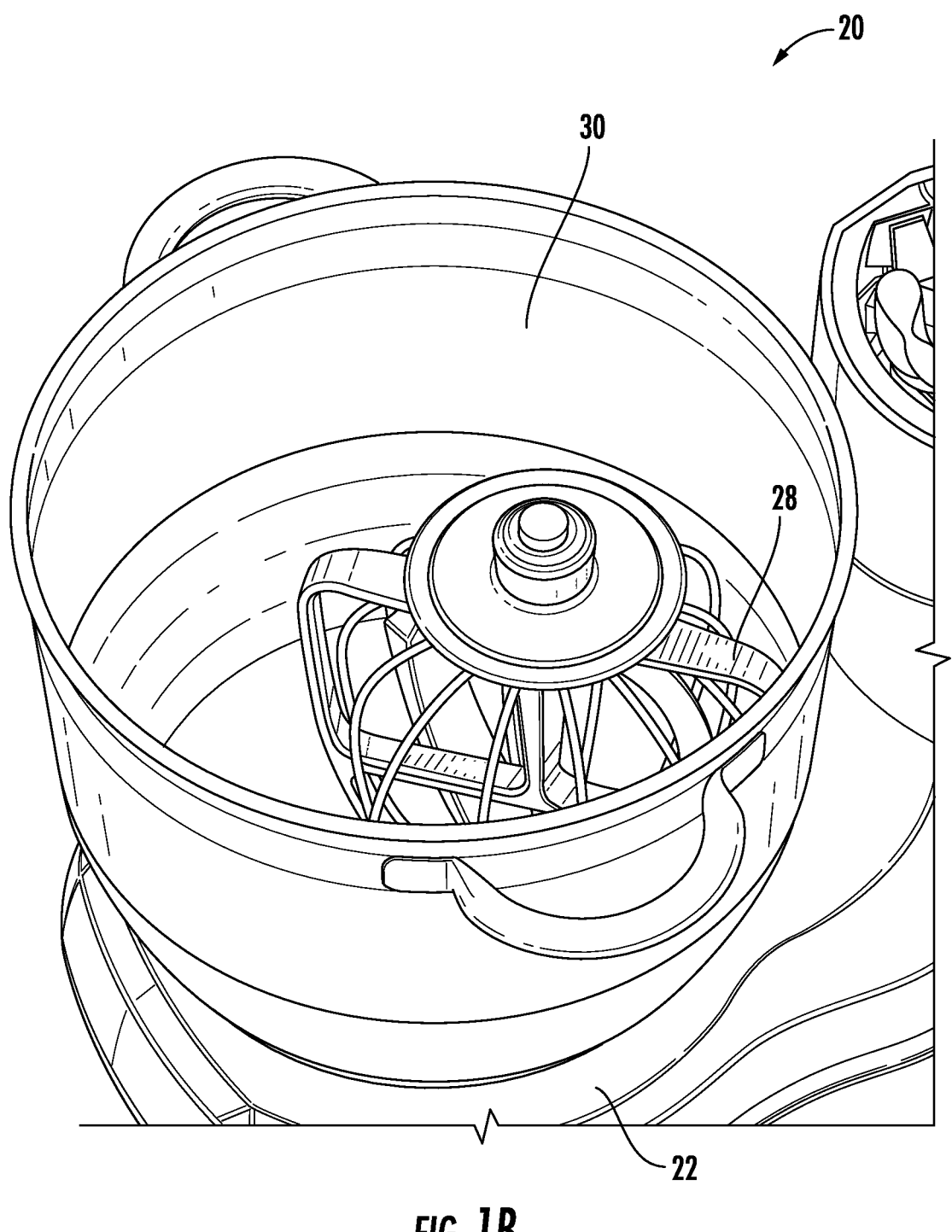
FIG. 1B is a partial top perspective view of the stand mixer of FIG. 1A with the tower removed.

Referring now to the figures, an exemplary stand mixer is shown in FIGS. 1A and 1B and designated broadly at 20. The stand mixer 20 includes a base 22, a tower 24 that rises vertically from a rear end of the base 22, and a head 26 that is cantilevered from an upper end of the tower 24 and overlies the front end of the base 22. Beaters 28 (FIG. 1B) extend downwardly from the free end of the head 26 into a bowl 30 that is positioned on the front end of the base 22.

Figure 2:
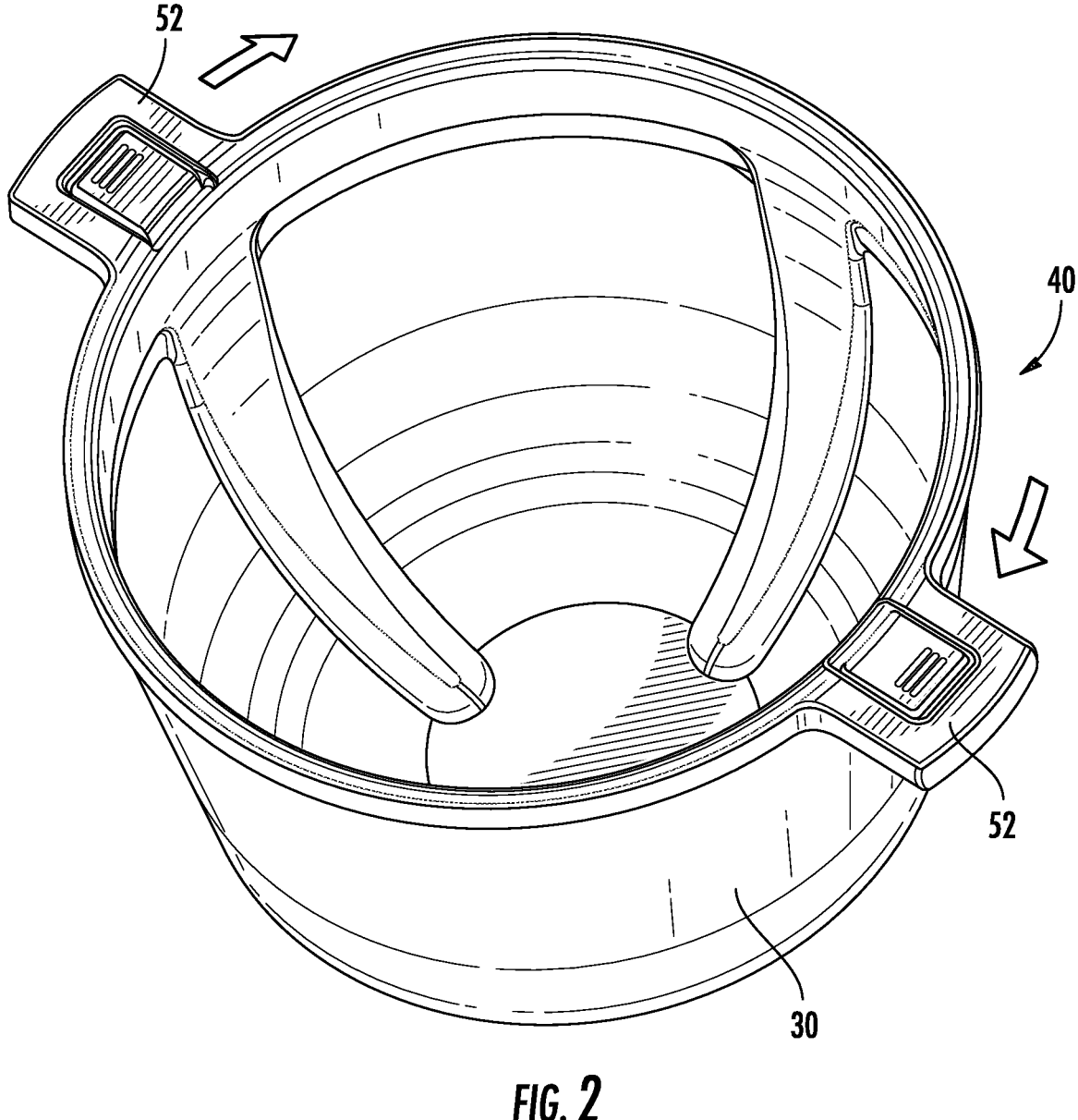
FIG. 2 is a top perspective view of a scraping unit mounted to a bowl of a stand mixer according to embodiments of the invention.
Figure 3:
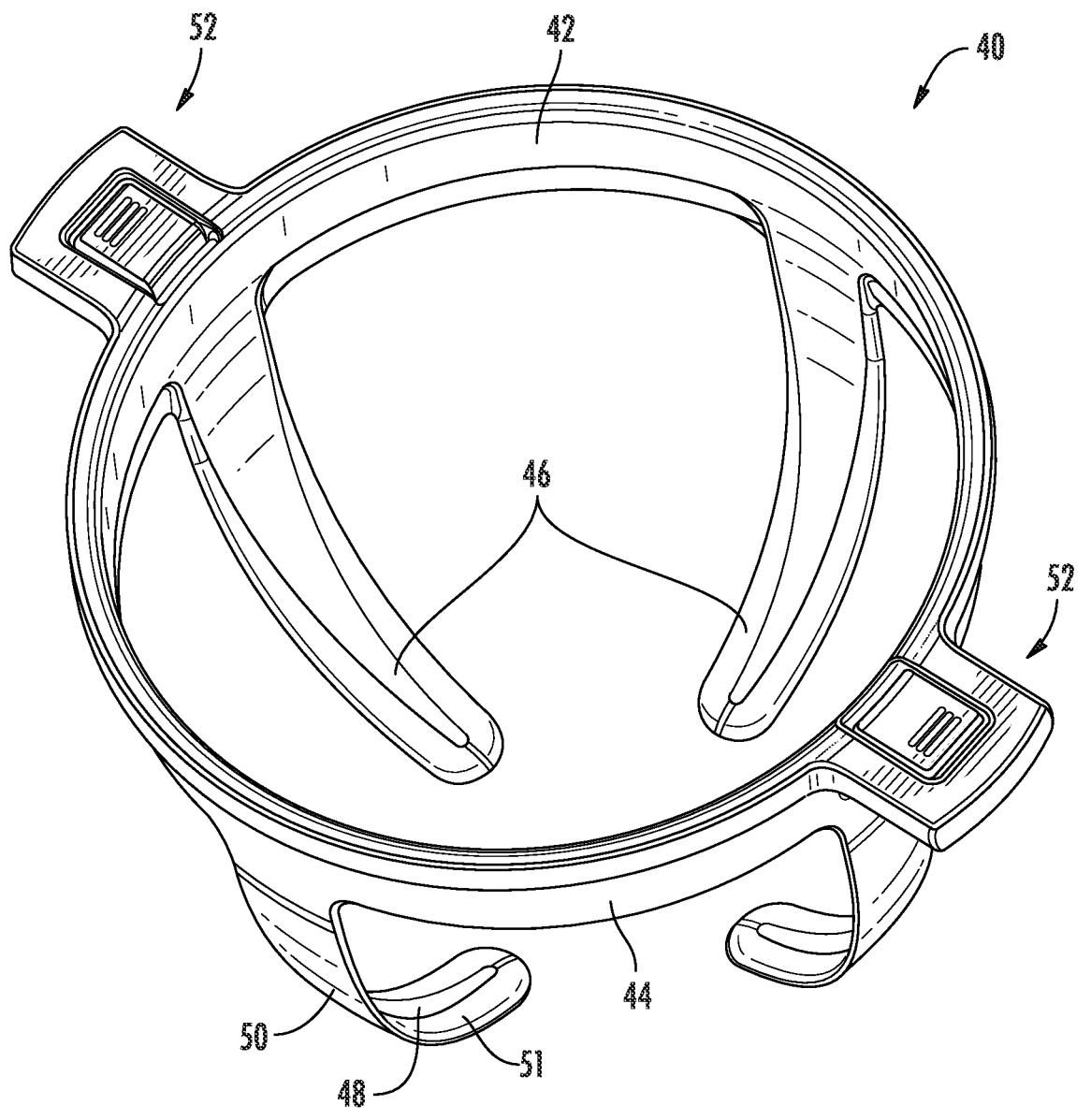
FIG. 3 Is a top perspective view of the scraping unit of FIG. 2.
Figure 4:
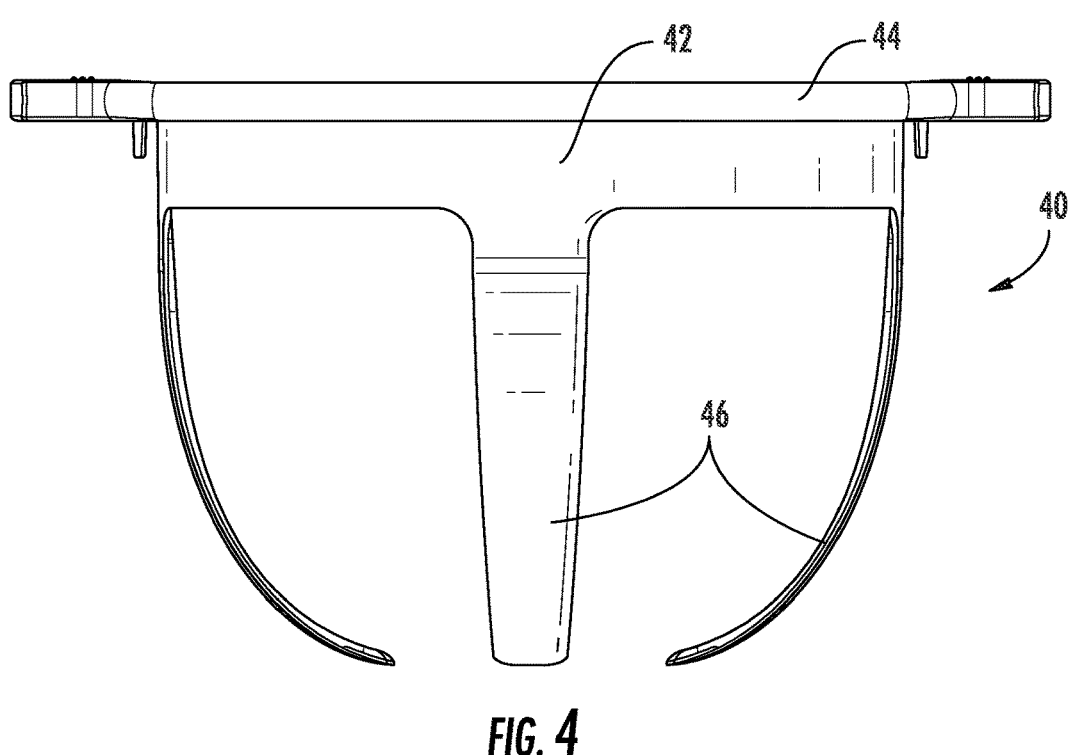
FIG. 4 is a side view of the scraping unit of FIG. 2.
Figure 5:
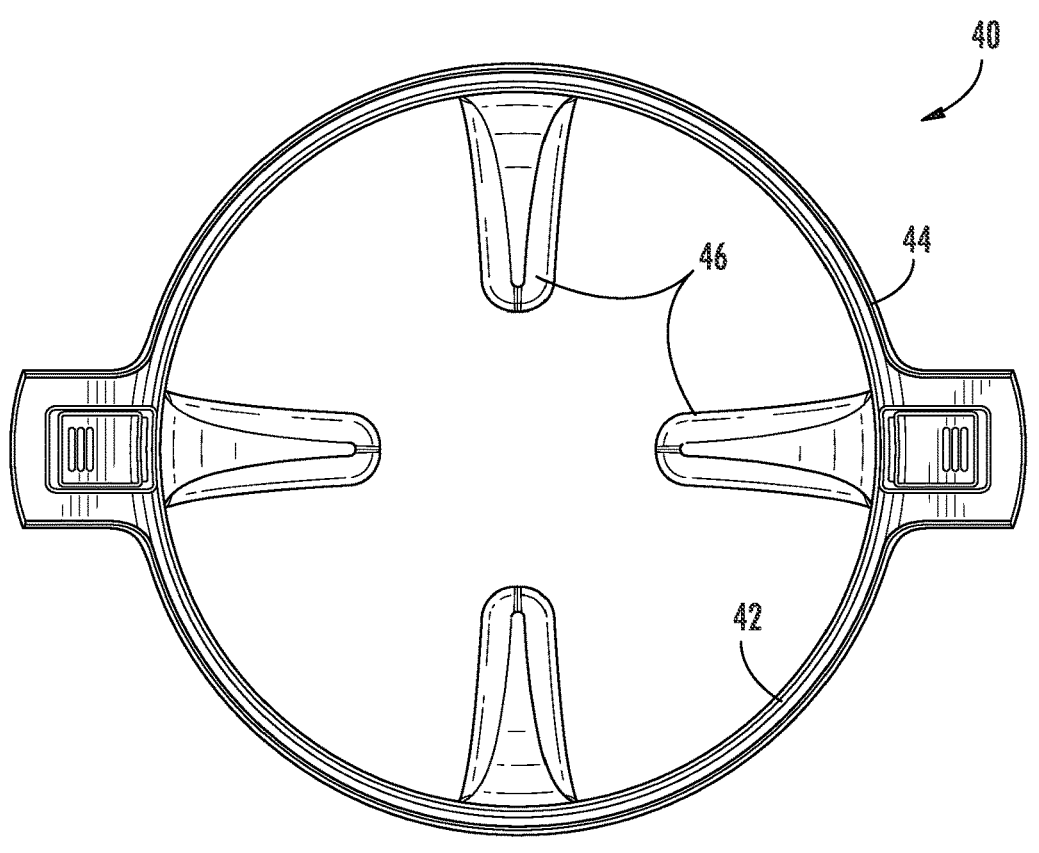
FIG. 5 is a top view of the scraping unit of FIG. 2.

Referring now to FIG. 2, the bowl 30 is shown with a scraping unit 40 rotatably mounted to the rim thereof. As can be seen in FIG. 3, the scraping unit 40 includes an upper ring 42 with a peripheral lip 44. Four fingers 46 are located substantially equidistant from each other on the upper ring 42. Each of the fingers 46 extends downwardly and radially inward from the upper ring 42. Each finger 46 has a curvilinear profile so that its lower surface substantially matches that of the inner surface of the bowl 30.

Figure 6:
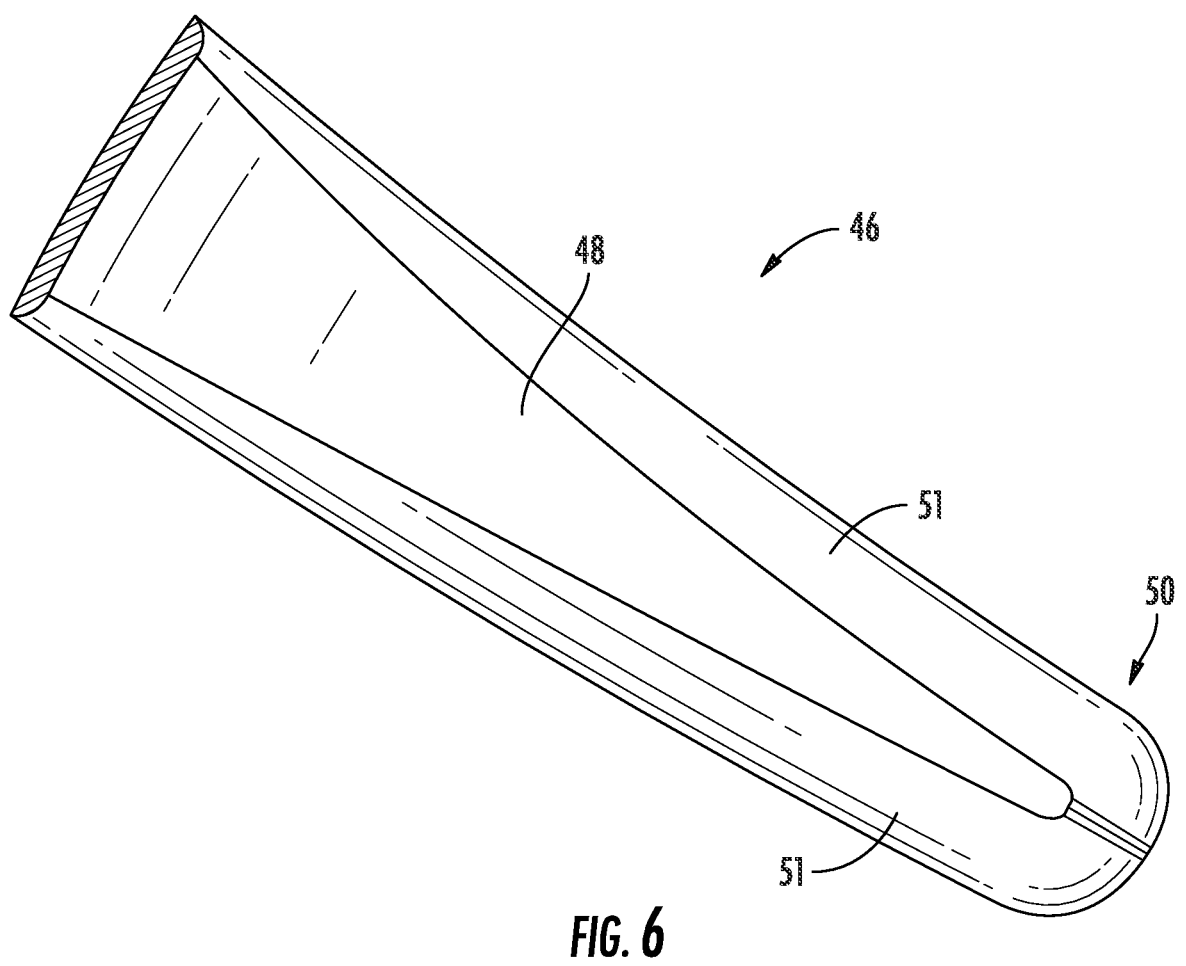
FIG. 6 is a section perspective view of one of the fingers of the scraping unit of FIG. 2.

As shown in FIG. 6, each finger 46 is tapered along its length so that it narrows from its fixed end to its free end on both its upper surface 48 and its lower surface 50. A transition surface 51 extends between the upper surface 48 and the lower surface 50 on each side of the finger 46. Because of the manner in which the upper surface 48 and lower surface 50 taper, the transition surface 51 is steeper near the fixed end of the finger 46 than at the free end of the finger 46.

Figure 7:
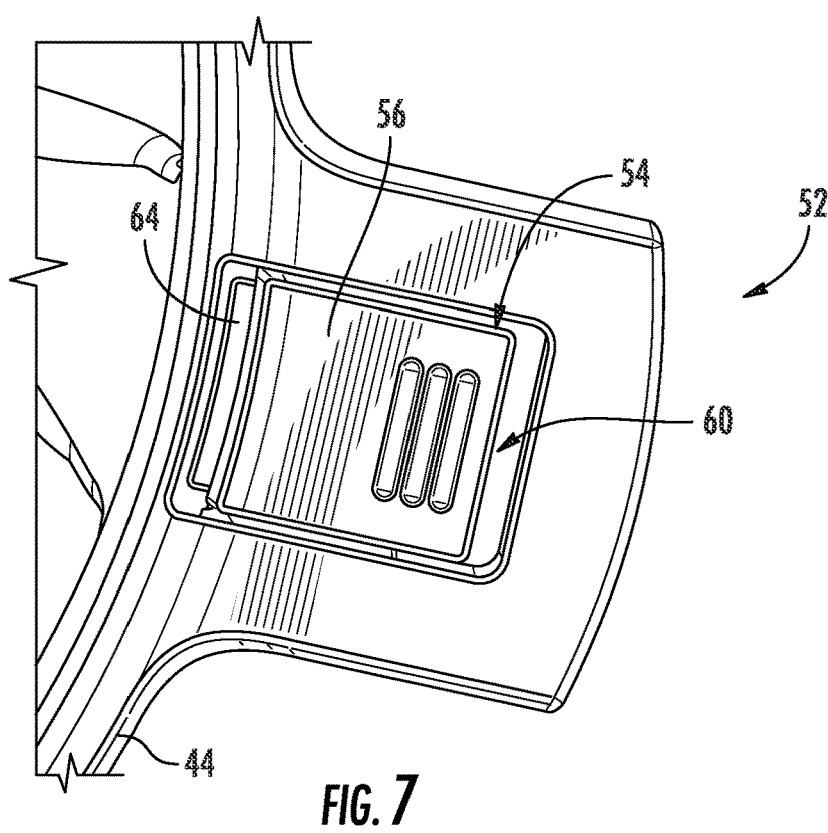
FIG. 7 is a partial top view of one of the handles of the scraping unit of FIG. 2.
Figure 8:
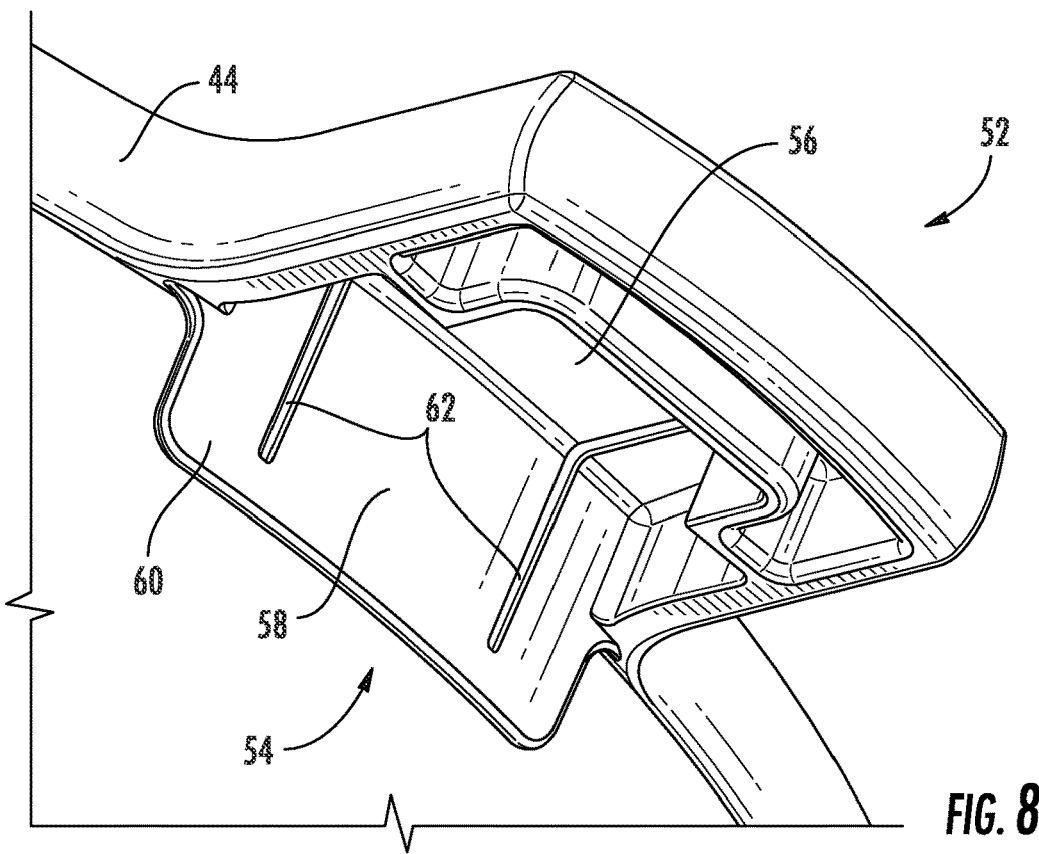
FIG. 8 is a partial bottom perspective view of the handle of FIG. 7.
Figure 9:
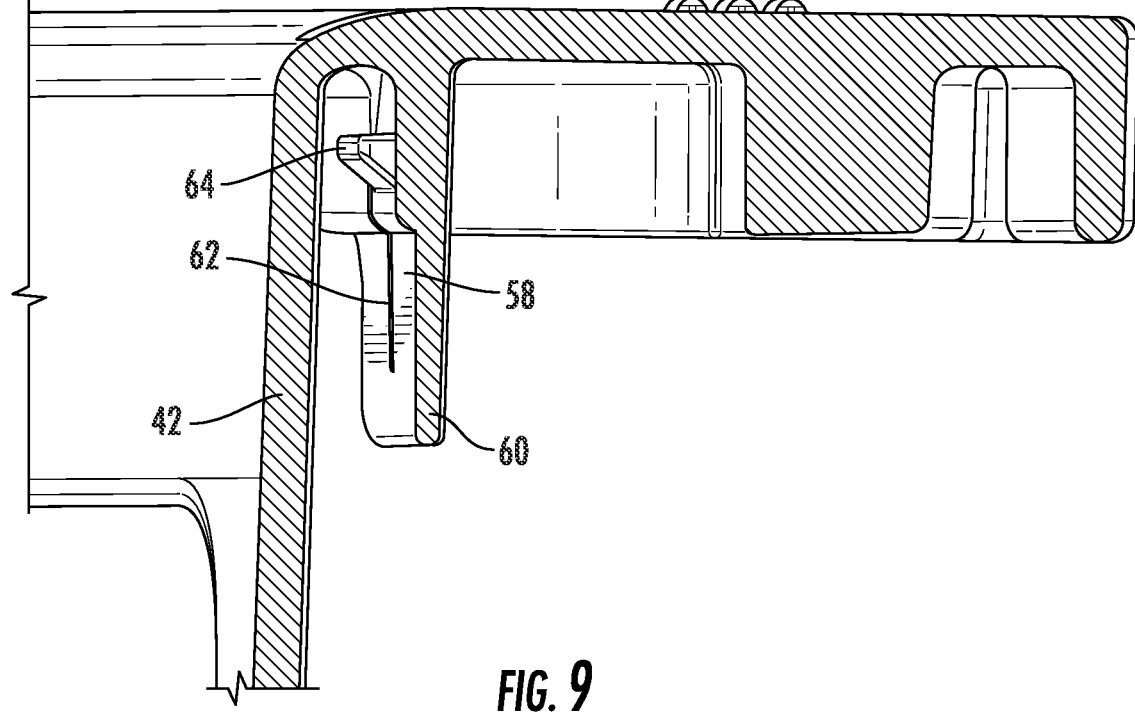
FIG. 9 is a partial side section view of the handle of FIG. 9.

FIG. 2 shows that the scraping unit 40 also has two handles 52 that extend radially outwardly from diametrically opposed locations on the lip 44. The handles 52 are configured for easy gripping by the user. In addition, each of the handles 52 includes a latch 54 that enables the scraping unit 40 to be snapped into place on the bowl 30. More specifically, and referring now to FIGS. 7-9, the latch 54 is generally L-shaped, with a horizontal panel 56 and a vertical panel 58. The horizontal panel 58 fits within a window 60 in the handle 52. The vertical panel 58 extends downwardly and merges at its lower end with a foundation panel 60 that is spaced slightly radially outwardly of the upper ring 42. Slots 62 divide the side edges of the vertical panel 58 from the foundation panel 60, such that the latch 54 can deflect relative to the foundation panel 60 and the handle 52. A capture nub 64 extends radially inwardly from the vertical panel 58.

As shown in FIG. 2, the scraping unit 40 is positioned in the bowl 30 so that the fingers 46 overlie the inner surface of the bowl 30. The scraping unit 40 can be snapped onto the bowl 30 by inserting the upper edge of the bowl 30 into the space between the upper ring 42 and the lip 44. As the upper edge of the bowl 30 is being inserted between the upper ring 42 and the lip 44, the portions of the upper edge of the bowl adjacent the handles 52 move between the upper ring 42 and the foundation surface 60 and, in doing so, engage the capture nub 64; as the upper edge of the bowl continues to be inserted, the bowl 30 forces the nub 64 radially outwardly and causes the latch 54 to deflect. Once the upper edge of the bowl 30 has passed the capture nub 64, the latch 54 recovers some of its deflection and captures the bowl between the foundation surface 60 and the upper ring 42. This arrangement allows the scraping unit 40 to rotate relative to the bowl 30; the upper ring 42 and lip 44 can slide relative to upper edge of the bowl 30 while the upper end of the bowl remains in place between the upper ring 42 and the lip 44 (secured in place by the capture nub 64).

In operation, the scraping unit 40 is snapped into place on the bowl as described above. The foodstuff to be mixed is then added to the bowl 30, and the bowl 30 is placed on the base 22 of the mixer and the beaters 28 are positioned into position for mixing. During mixing, as foodstuff collects on the inner surface of the bowl 30 outside the reach of the beaters 28, the scraping unit 40 can be rotated relative to the bowl 30 by the user grasping the handles 52 and causing the scraping unit 40 to rotate relative to the bowl 30 (see arrows in FIG. 2). With such rotation, the fingers 46 of the scraping unit 40 slide along the inner surface of the bowl 30, thereby reaching foodstuff that has collected there. The tapered profile of the finger 46 and the gradually decreased steepness of the transition surfaces causes the collected foodstuff to be directed both radially inwardly and downwardly back within the range of the beaters 28 for further mixing.

Notably, the scraping unit 40 may be employed without having to remove the beaters from their operating position inside the bowl 30. Also, in some embodiments, the scraping unit 40 may be employed while the beaters 28 are still operating. In either instance, the user can save time by not having to interrupt the mixing operation.

The scraping unit 40 can be removed from the bowl 30 by pressing the horizontal surfaces 56 of the latches 54 downwardly. This action causes the capture nub 64 to deflect radially outwardly, which frees the upper edge of the bowl 30 to be disassembled from the scraping unit 40.

The scraping unit 40 may be formed of any suitable material, but in some embodiments may be formed of a polymeric material such as glass-filled polypropylene. Typically, the scraping unit 40 is formed of a material that is considered safe for use with foodstuffs, and that is dishwasher-safe.

Figure 10:
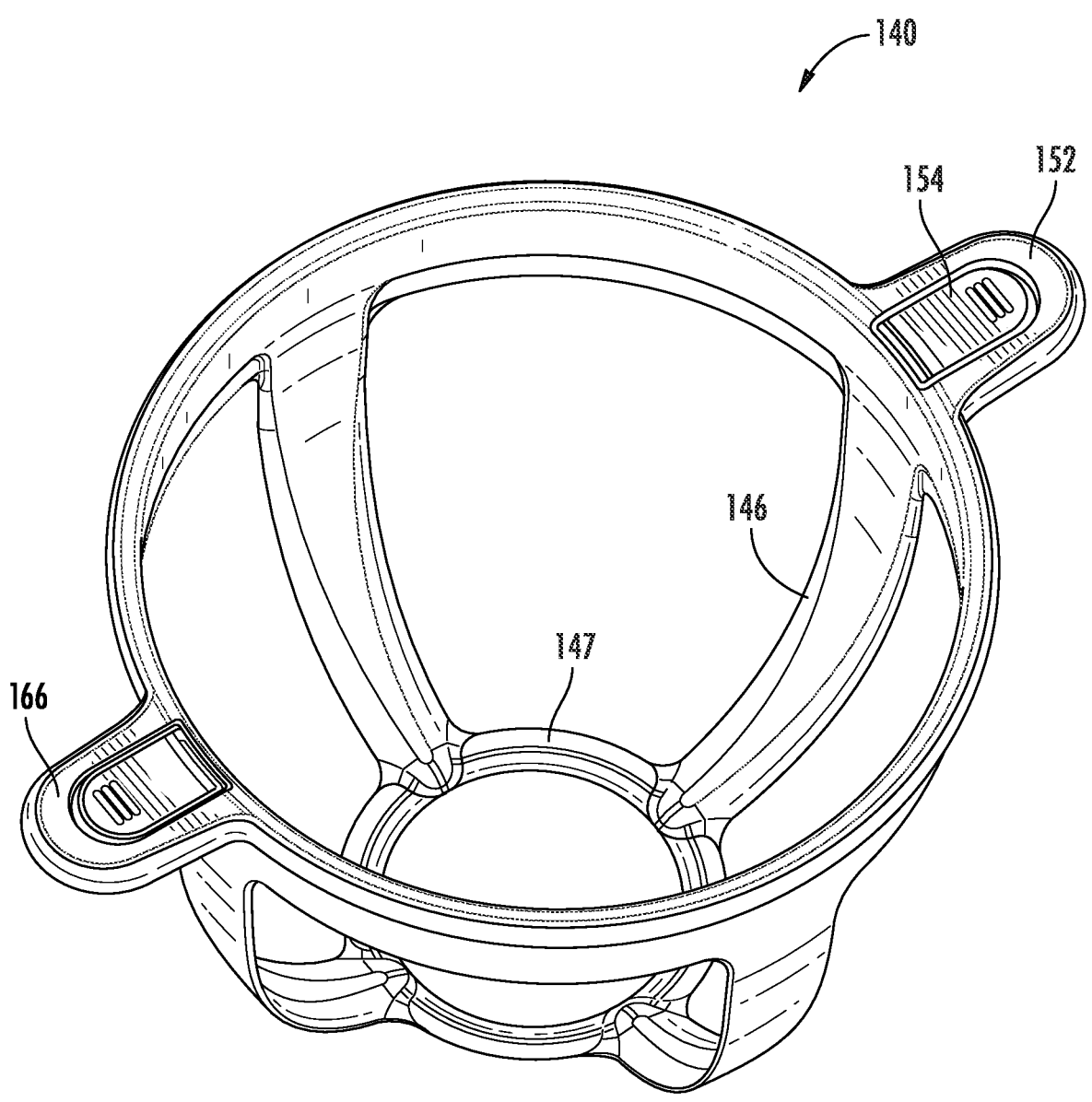
FIG. 10 is a top perspective view of a scraping unit according to alternative embodiments of the invention.
Figure 11:
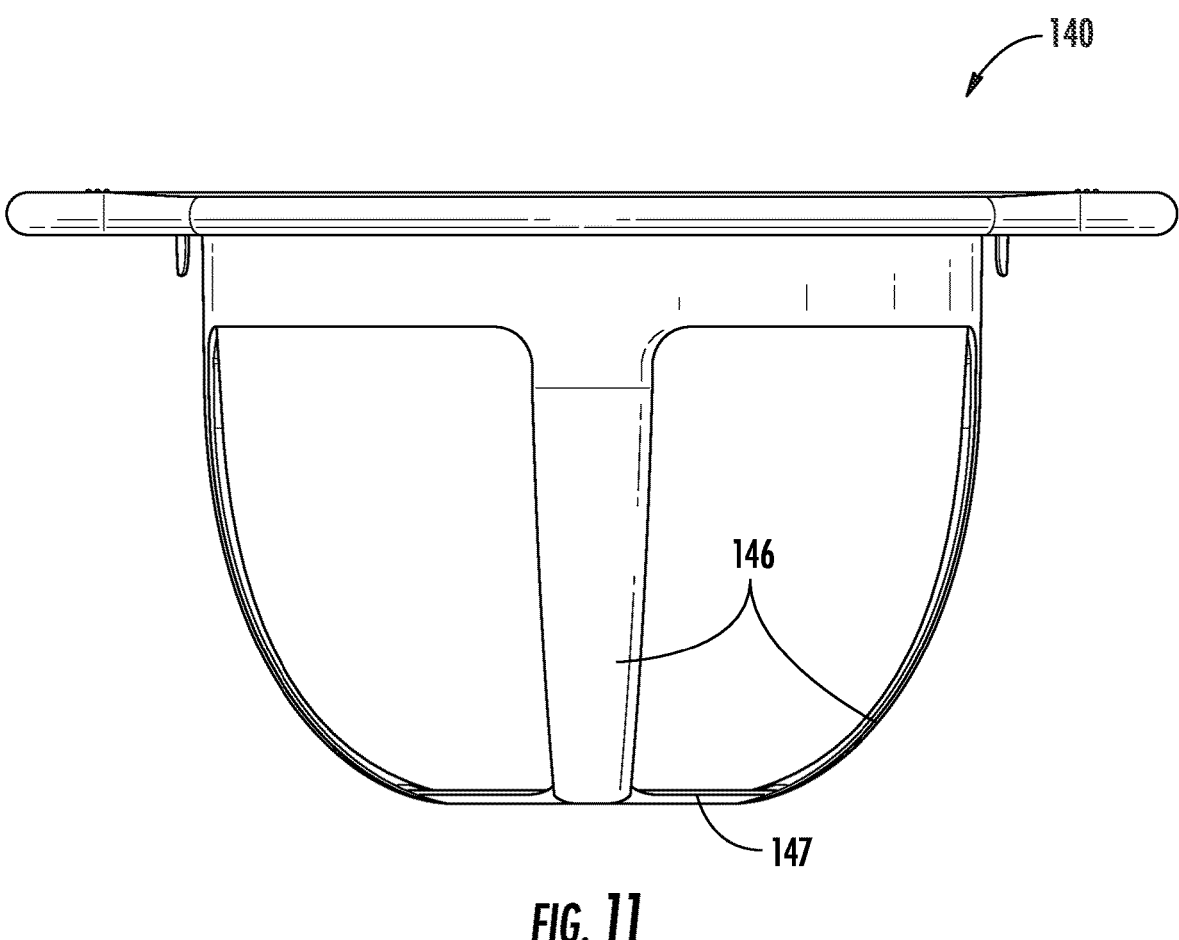
FIG. 11 is a side view of the scraping unit of FIG. 10.
Figure 12:
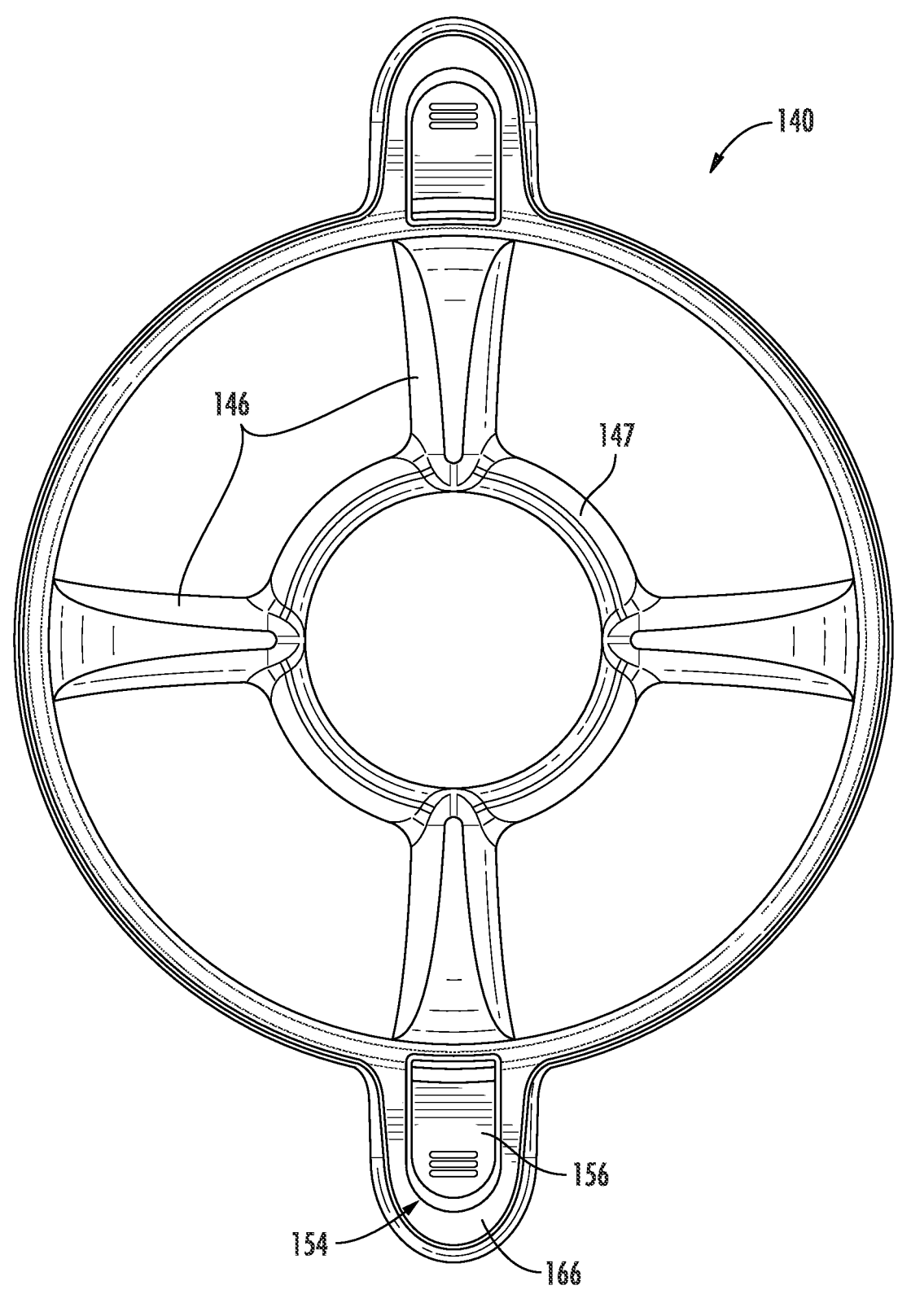
FIG. 12 is a top view of the scraping unit of FIG. 10.

Another embodiment of a scraping unit is shown in FIGS. 10-13 and is designated broadly at 140. The scraping unit 140 is similar to the scraping unit 40 with the exceptions that (a) the latches 154 of the handles 152 of the scraping unit 140 are shaped somewhat differently (e.g., the horizontal panel 156 is rounded at its free end), (b) an overmolded gripping tab 166 is present on the end of each handle 152, and (c) a lower ring 147 is attached to the lower ends of the fingers 146. As can be seen in FIGS. 10 and 12, the lower ring 147 ties together the ends of the fingers 146, thereby stiffening the fingers 146, which can render the fingers 146 more effective during any scraping action.

Figures 13, 14:
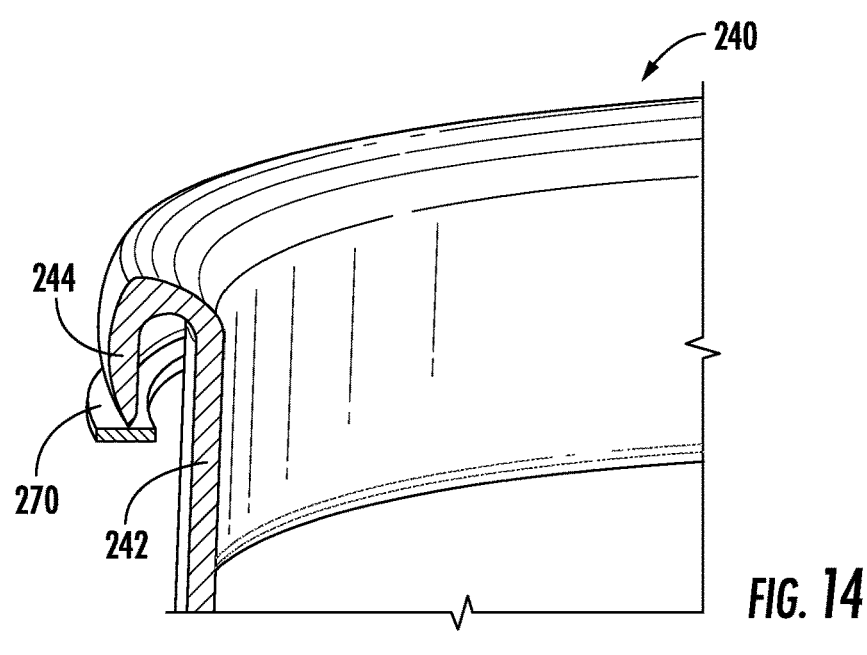
FIG. 13 is a perspective view of a scraping unit according to further embodiments of the invention.
FIG. 14 is a partial section perspective view of the lip of the scraping unit of FIG. 13.

A further embodiment of a scraping unit is shown in FIGS. 13 and 14 and designated broadly at 240. The scraping unit 240 is similar to the scraping unit 140 with the exception that the handles 252 have no latches; instead, a rubber ring 270 is attached to the lower end of the lip 244 of the scraping unit 240. The upper edge of a bowl can fit within the gap between inner surface of the rubber ring 270 and the upper ring 242 to secure the scraping unit 240 to the bowl.

Figure 15:
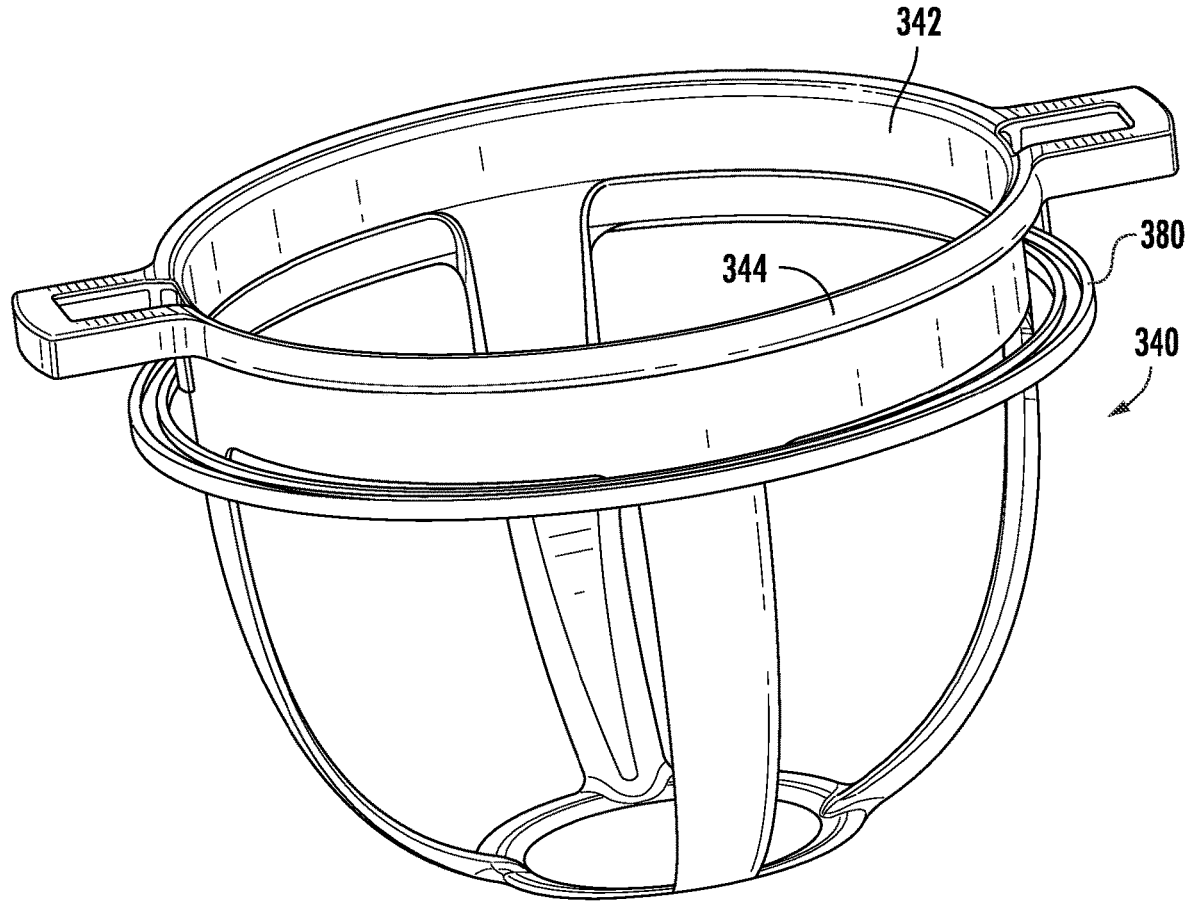
FIG. 15 is an exploded perspective view of a scraping unit according to further embodiments of the invention.

A still further embodiment of scraping unit is shown in FIG. 15 and designated broadly at 340. The scraping unit 340 is similar to the scraping unit 240, with the exception that the rubber ring is replaced with a separate ring 380 that fits around the outside of the bowl and engages the upper ring 342 and lip 344 of the scraping unit 340 to secure the scraping unit 340 to the bowl.

The scraping units 40, 140 may also take other forms. For example, more or fewer fingers 46, 146 may be included, and/or the configurations of the fingers 46, 146 themselves may vary (e.g., the length, width, cross-section, and/or degree of taper may vary). The manner of attaching the scraping units 40, 140 to the bowl 30 may vary; for example, the latches 54 may differ in configuration, or the upper ring 42 and/or lip 44 may have a circumferential ridge or bead that snaps over the upper edge of the bowl 30. The scraping unit 140 may include a third, intermediate ring that connects the central portions of the fingers for further stability. Other variations may also be apparent to those of skill in this art.

It is also contemplated that the scraping units 40, 140 may be provided as part of a kit with the bowl 30 to ensure proper mating of the scraping units 40, 140 with the upper edge of the bowl 30. Such a kit may also include the stand mixer 20.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A scraping unit for a stand mixer, comprising:
an upper ring; and
a plurality of fingers extending downwardly from the upper ring, the fingers having a curvilinear profile selected to confront an inner surface of a bowl of a stand mixer,
wherein the upper ring includes a peripheral lip positioned radially outwardly of the upper ring, wherein a gap between the upper ring and the lip is configured to receive an upper edge of the bowl of the stand mixer.

2. The scraping unit defined in claim 1, further comprising a pair of handles extending radially outwardly from the upper ring.

3. The scraping unit defined in claim 2, wherein each of the handles comprises a latch configured to engage an upper edge of the bowl of the stand mixer.

4. The scraping unit defined in claim 1, wherein the plurality of fingers is at least three fingers.

5. The scraping unit defined in claim 1, wherein each of the fingers has an upper surface and a lower surface, wherein each of the upper and lower surfaces tapers to narrow with increasing distance from the upper ring.

6. The scraping unit defined in claim 5, wherein the upper surface tapers to a greater degree than the lower surface.

7. The scraping unit defined in claim 1, further comprising a lower ring attached to lower ends of the fingers.

8. The scraping unit defined in claim 1, formed of a polymeric material.

9. The scraping unit defined in claim 1, in combination with the bowl of the stand mixer, wherein the upper ring engages an upper edge of the bowl.

10. A method of using a stand mixer, comprising:
(a) positioning a scraping unit on a bowl of a stand mixer, the scraping unit including:
an upper ring that engages an upper edge of the bowl;
a plurality of fingers extending downwardly from the upper ring, the fingers having a curvilinear profile selected so that the fingers confront an inner surface of the bowl;
(b) mixing a foodstuff contained in the bowl with beaters of the stand mixer; and
(c) rotating the scraping unit relative to the bowl to convey portions of the foodstuff that have collected outside the range of the beaters into the range of the beaters.

11. The method defined in claim 10, wherein the upper ring includes a peripheral lip positioned radially outwardly of the upper ring, wherein a gap between the upper ring and the lip receives an upper edge of the bowl of the stand mixer.

12. The method defined in claim 10, further comprising a pair of handles extending radially outwardly from the upper ring, and wherein the rotating step comprises grasping the handles to induce rotation between the scraping unit and the bowl.

13. The method defined in claim 12, wherein each of the handles comprises a latch that engages the upper edge of the bowl of the stand mixer, and wherein the positioning step comprising latching the scraping unit to the upper edge of the bowl.

14. The method defined in claim 10, wherein the plurality of fingers of the scraping unit is at least three fingers.

15. The method defined in claim 10, wherein each of the fingers of the scraping unit has an upper surface and a lower surface, wherein each of the upper and lower surfaces tapers to narrow with increasing distance from the upper ring.

16. The method defined in claim 15, wherein the upper surface tapers to a greater degree than the lower surface.

17. The method defined in claim 10, wherein the scraping unit further comprises a lower ring attached to lower ends of the fingers of the scraping unit.

18. The method defined in claim 10, wherein step (b) is performed as the bowl rests on a base of the stand mixer, and wherein step (c) is performed as the bowl rests on the base.

19. The method defined in claim 10, wherein step (c) is performed during step (b).

* * * * *